(12) United States Patent
Wolf et al.

(10) Patent No.: US 7,542,966 B2
(45) Date of Patent: Jun. 2, 2009

(54) METHOD AND SYSTEM FOR RETRIEVING DOCUMENTS WITH SPOKEN QUERIES

(75) Inventors: Peter P. Wolf, Winchester, MA (US); Joseph K. Woelfel, Watertown, MA (US); Bhiksha Ramakrishnan, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 434 days.

(21) Appl. No.: 11/067,165

(22) Filed: Feb. 25, 2005

(65) Prior Publication Data

US 2005/0149516 A1    Jul. 7, 2005

Related U.S. Application Data

(63) Continuation-in-part of application No. 10/132,753, filed on Apr. 25, 2002, now Pat. No. 6,877,001.

(51) Int. Cl.
*G06F 17/30* (2006.01)
(52) U.S. Cl. ........................................................ 707/3
(58) Field of Classification Search ................ 707/2–5; 715/201, 229, 234
See application file for complete search history.

(56) References Cited

U.S. PATENT DOCUMENTS

| 5,974,412 | A | 10/1999 | Hazlehurst et al. |
| 6,847,966 | B1 | 1/2005 | Sommer et al. |
| 6,882,970 | B1* | 4/2005 | Garner et al. ............... 704/236 |
| 2003/0204399 | A1* | 10/2003 | Wolf et al. .................. 704/251 |
| 2003/0204492 | A1 | 10/2003 | Wolf et al. |
| 2006/0235696 | A1* | 10/2006 | Bennett .................... 704/270.1 |

FOREIGN PATENT DOCUMENTS

| EP | 1303105 | 4/2003 |
| EP | 1315096 | 5/2003 |

* cited by examiner

*Primary Examiner*—Diane Mizrahi
(74) *Attorney, Agent, or Firm*—Dirk Brinkman; Gene Vinokur

(57) ABSTRACT

A method indexes and retrieves documents stored in a database. A document feature vector is extracted from each document and the documents are then indexed according to the feature vectors. A spoken query is converted to an intermediate representation representing likelihoods of possible sequential combinations of terms in the spoken query. A query certainty vector is generated from the intermediate representation. Other information is acquired. The other information is combined with the query certainty vector. The query vector and the other information are then compared to each of the document feature vectors to retrieve a ranked result set of documents.

13 Claims, 4 Drawing Sheets

METHOD AND SYSTEM FOR RETRIEVING DOCUMENTS WITH SPOKEN QUERIES

RELATED APPLICATIONS

This application is a Continuation-in-Part of U.S. patent application Ser. No. 10/132,753 entitled "Retrieving Documents with Spoken Queries" and filed by Wolf et al. on Apr. 25, 2002 now U.S. Pat. No. 6,877,001.

FIELD OF THE INVENTION

The present invention relates generally to indexing and retrieving documents, and multi-media content from a database, and more particularly to retrieving from databases using spoken queries.

BACKGROUND OF THE INVENTION

The Internet provides worldwide access to a huge number of databases storing publicly available multi-media content and documents. Much of the content is in the form of audio and video records. Typically, browsers and search engines executing on desktop systems are used to retrieve the stored documents by having the user specify textual queries or follow links. The typed queries typically include key words or phrases, and the output is also text or images.

Portable communications devices, such as cellular telephones and personal digital assistants (PDAs), can also be used to access the Internet. However, such devices have limited textual input and output capabilities. For example, keypads of cell phones are not particularly suited for typing input queries, and many PDAs do not have character keys at all. The displays of these devices are also of a limited size and difficult to read. These types of devices are better suited for speech input and output, particularly if the document includes an audio signal, such as speech or music. Therefore, spoken queries are sometimes used.

Prior art document retrieval systems for spoken queries typically use a speech recognition engine to convert a spoken query to a text transcript of the query. The query is then treated as text and information retrieval processes can be used to retrieve pertinent documents that match the query.

However, that approach discards valuable information, which can be used to improve the performance of the retrieval system. Most significantly, the entire audio spectral signal that is the spoken query is discarded, and all that remains is the raw text content, often misinterpreted.

When either the documents or the query are specified by speech, new techniques must be provided to optimize the performance of the system. Techniques used in conventional information retrieval systems that retrieve documents using text queries perform poorly on spoken queries and spoken documents because the text output of speech recognition engine often contains errors. The spoken query often contains ambiguities that could be interpreted many different ways. The converted text can even contain words that are totally inconsistent within the context of the spoken queries, and include mistakes that would be obvious to any listener. Simple text output from the speech recognition engine throws away much valuable information, such as what other words might have been said, or what the query sounded like. The audio signal is usually rich and contains many features such as variations in volume and pitch, and more hard to distinguish features such as stress or emphasis. All of this information is lost.

Therefore, it is desired to improve information retrieval systems that use spoken queries. Moreover, it is desired to retain certainty information of spoken queries while searching for documents that could match the spoken query. Particularly, document retrieval would be improved if the probability of what was said or not said were known while searching multi-media databases.

SUMMARY OF THE INVENTION

A system and method indexes and retrieves documents stored in a database. Documents are defined to be any set of items with associated text, e.g., artist, album, and title for a song. A full document feature vector is extracted for each document to be indexed. Optionally, the document feature vector is projected to a low dimension document feature vector. In either case, the documents are indexed according to full or low dimension document feature vectors.

A speech recognition engine converts a spoken query to an intermediate representation. The intermediate representation retains some of the characteristics of the audio signal. The intermediate representation can be a word lattice; a lattice of parts of words; a phonetic lattice; or an n-best list of words, parts of words or phonemes. The parts of words can be syllables or other word segments. Collectively, words, parts of words, syllables, and phonemes are defined herein as 'terms'.

In any case, the intermediate representation indicates possible sequential combinations of terms in the spoken query. It should be noted that the intermediate representation is unlike a conventional converted text string representing a best effort by the speech recognition engine to interpret the spoken query to a single text string. It is well known that a straightforward conversion to text is likely to be erroneous.

The intermediate representation is converted to a query certainty vector, which can optionally be projected to a low dimension query certainty vector. The query vector is compared to each of the document feature vectors to retrieve a matching set of result documents. The set of result documents can be ranked.

In addition, other information can also be used to produce and rank the set of result documents, e.g., user preferences or locations. In addition, multiple spoken queries can be combined into a single query using Boolean operators, such as AND, OR, and NOT. In this way, one can approximate logical queries of the form "X and Y, or Z, but not Q."

DETAILED DESCRIPTION OF THE PREFERRED EMBODIMENT

The invention provides a system and method for retrieving documents from multi-media database using spoken queries. The idea of the invention is to retain certainty information that indicates what was said in the spoken queries, and to use this information while searching for matching documents in the database. The certainty information indicates the probabilities of what the terms are and the order in which they occur. The certainty information can also use other spectral features of the audio signal, such as changes in volume and pitch to determine if certain terms in the spoken queries are more important than others. Similarly, documents stored in the database are also indexed according to a model that retains the certainty of the terms in the documents that are indexed.

The system and method according to the invention determines and compares feature vectors generated from speech or text. Comparing feature vectors provides a metric for determining the pertinence of documents given a particular spoken query. The metrics are used to retrieve pertinent documents of recorded speech and text given queries of recorded speech or text.

Indexing Documents

The invention provides the following embodiments for indexing documents. A first embodiment indexes and retrieves documents using full dimension document feature vectors. A second embodiment indexes and retrieves documents using low dimension document feature vectors.

Figure 1:
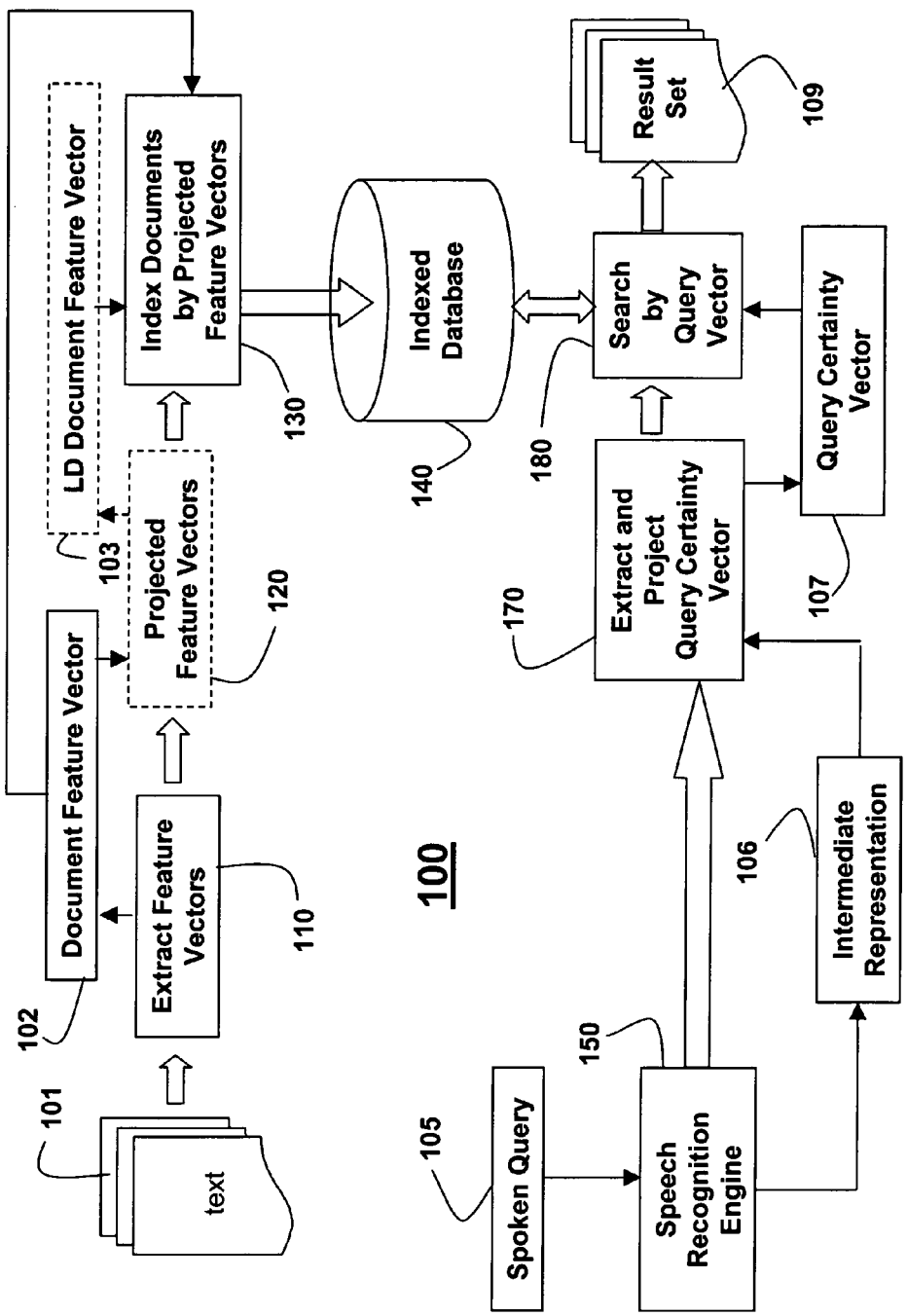
FIG. 1 is a block diagram of an information retrieval system that uses spoken queries according to the invention.

FIG. 1 shows a document indexing and retrieval system 100 according to the invention. Input to the system are documents 101. A document feature vector 102 is extracted 110 for each document. The document feature vector 102 is a weighted list of all words in the document. The document feature vector can also be composed of 'terms' as defined and described in detail below. The weight of each term is equal to its frequency of appearance in the document. Terms that occur more frequently can be considered more important.

Each document feature vector is optionally projected 120 to a lower dimension to produce a low dimension (LD) document feature vector 103. The projection can use a singular value decomposition (SVD) to convert from a conventional vector space representation to a low dimensional projection. SVD techniques are well known. Alternatively, a latent semantic analysis (LSA) projection can be used. LSA is similar to SVD except that it is based on statistical properties of the term frequencies.

Other low dimension projective representations are also possible. What is common with all of these techniques is that every document is represented by a low dimension vector of values associated with the terms that appear in that document. The values associated with the terms are a measure of the estimated relative importance of that term to the document. A filter can also be applied to ignore common terms such as articles, e.g., "the," and connectors. The terms to be filtered and ignored can be maintained as a separate list, perhaps editable by the user.

The document feature vector, full or low dimension, is then used to index 130 the documents in a database 140.

Interpreting Spoken Queries

The invention provides the following for determining query certainty vectors from spoken queries. A first embodiment uses a full dimension query certainty feature vector. A second embodiment uses a low dimension query certainty vector.

A spoken query 105 to search 180 the database 140 is processed as follows. The spoken query is provided to a speech recognition engine 150. However, instead of converting the spoken query directly to text, as in the prior art, the system according to the invention generates an intermediate representation 106. The intermediate representation 106 retains some of the characteristics of the audio speech signal and is not a straightforward conversion to a text string, as in the prior art.

The intermediate representation can be in the form of a word, parts of words, syllables, word segments, or phonemes. Collectively, words, parts of words, word segments, syllables, and phonemes are defined herein as 'terms'. For example, the Japanese spoken phrase "jamanasi ken no kijosato gendai bizjucukan" is converted to terms "ja ma na si ke n no ki jo sa to ge n da i bi zju cu ka n." Converting spoken queries to terms has the advantage that a term-based speech recognizer needs a much smaller vocabulary than a large vocabulary word recognizer. Therefore, a term-based recognizer can be much smaller and much faster than a large vocabulary word recognizer.

The terms can be arranged as a lattice or an n-best list.

A lattice might represent the intermediate result in two ways: 1) nodes represent the terms, and directed edges connecting the terms represent the possible orders in which the terms could have been spoken with associated certainty and 2) edges represent the terms, and nodes connecting the edges to represent the possible orders in which the terms could have been spoken with associated certainty. Generally, the certainty information includes statistical likelihoods or probabilities.

The n-best list represents the intermediate result as series of transcripts with associated certainty for each transcript and the individual words in the transcript.

In general, lattices and n-best lists are equivalent. With no loss of information, a lattice can be converted to an n-best list, and an n-best list can be converted to a lattice.

Thus, the intermediate representation retains information about the certainty associated with the ambiguities in the spoken query. This is unlike conventional use of speech recognition, which makes use of a single, possibly erroneous, text string. That is, the intermediate representation 106 represents possible sequential combinations of the terms that might have been spoken, with associated probability scores.

The output of a typical prior art speech recognition engine is usually a string text corresponding to best effort interpretation of the spoken query. Because the speech recognition engine often produces errors, not all the words in the hypothesized transcript will always be correct. This may result in the transcript not including words that are crucial to retrieval. On the other hand, the text may contain spurious words, or words converted totally out of context that result in an erroneous retrieval.

In order to compensate for these errors, the invention represents the spoken query as a certainty vector. Each element of this vector represents a term that might have been spoken, and its value represents the certainty or probability that the term was actually spoken, as well as the order in which the terms were spoken.

There are several ways of determining 170 the query certainty vector 107. By comparing the scores of all paths that pass though the nodes in the lattice with the total scores of all paths in the lattice, one can determine the probability of every node in the lattice. This results in a list of all terms that might have been said with associated probabilities.

Another embodiment determines the query certainty vector from the n-best list. The query vector values are calculated from each transcript choice and associated confidence value in the n-best result.

A classifier can consider various properties of the nodes in the lattice, including frequency scores, such as produced above, and can produce the confidences associated with the nodes. Classifier methods include Gaussian classification, boosting based classification, and rule based heuristics based on properties of the lattice. Examples include lattice densities at various points in the lattice. As stated above, the probabilities can also consider other features of the audio signal to determine if certain terms are emphasized in the speech. Contextual information can also be used. For example, recognized terms that seem out of context can be given lower certainty scores.

The final certainty value for any term in the intermediate representation is a combination of the confidences or certainties produced by the above methods for all instances of the possible terms in the intermediate representation 106.

Every element of the query certainty vector is proportional to an estimate of the number of instances of the corresponding term in the document or query. This certainty vector is an analog of the document feature vector space representation 102 of documents 101, and can optionally be subjected to the same projection (SVD, LSA, etc.) applied to the document feature vectors 102 to produce a low dimension query certainty vector. In any case, the query certainty vector is used to index the database 140 to produce a set of result documents 109 that satisfy the spoken query 105.

Retrieving Documents

Given a spoken query, retrieving the pertinent documents 109 from the database is straightforward. The steps are: use a speech recognizer to map the spoken query to the intermediate representation; determine the set of possible terms spoken with associated weights; generate a certainty vector from the set of possible terms with associated weight; and compare the query certainty vector to each mapped document feature vector to obtain a pertinence score. The documents in the set of result documents 109 can then be presented to a user in a ranked order of their pertinence scores. Documents with a score less than a predetermined threshold can be discarded.

Combining Spoken Queries with Other Information

In many applications, the system 100 may have access to additional information beyond just the audio of the spoken query. This information can be used to improve the set of result documents 109. This information may be one dimensional, e.g., a location; multi-dimensional, e.g., user preferences; or multi-query, e.g., queries combined by logical operators.

Combining Spoken Queries with Locations

The location of a particular to item is an example of a single dimensional piece of additional information. For example, the user may be searching a navigation database for a point of interest (POI) that is located near a current position of the user. The position can be obtained from GPS information or other navigational systems as are now frequently used in automobiles. The user can also speak the position, either geographically or address-wise, for example, "at mile 300 Route 66 West" or "123 Main Street."

In this case, the system 100 compares the spoken description of the desired POI with the location of each POI in the database. The set of result documents 109 is than rank ordered according to the distance between the user and the points of interest.

Figure 2:
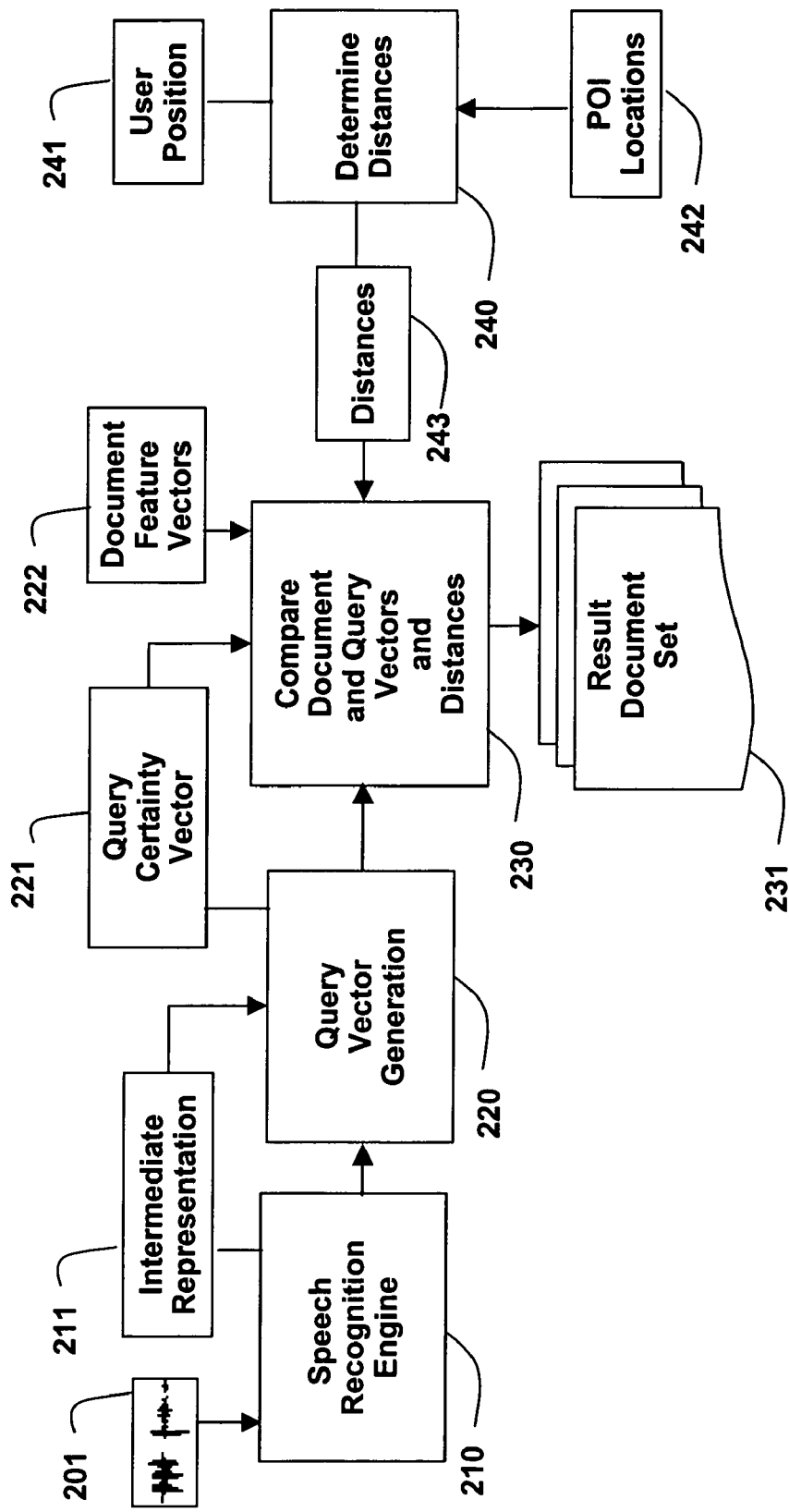
FIG. 2 is a block diagram of a retrieval system using location as other information to produce a set of result documents.

As shown in FIG. 2, a spoken query 201 is converted by a speech recognition engine 210 to an intermediate representation 211, as described above. A query certainty vector 221 is generated 220 from the intermediate representation. Distances 243 are determined 240 between a user position 241 and locations of points of interest (POI) 242 stored in a database. The query certainty vector 221, document features vectors 222, and distances 243 are then compared 230 to produce a ranked set of result documents 231.

Logically Combining Multiple Spoken Queries

Figure 3:
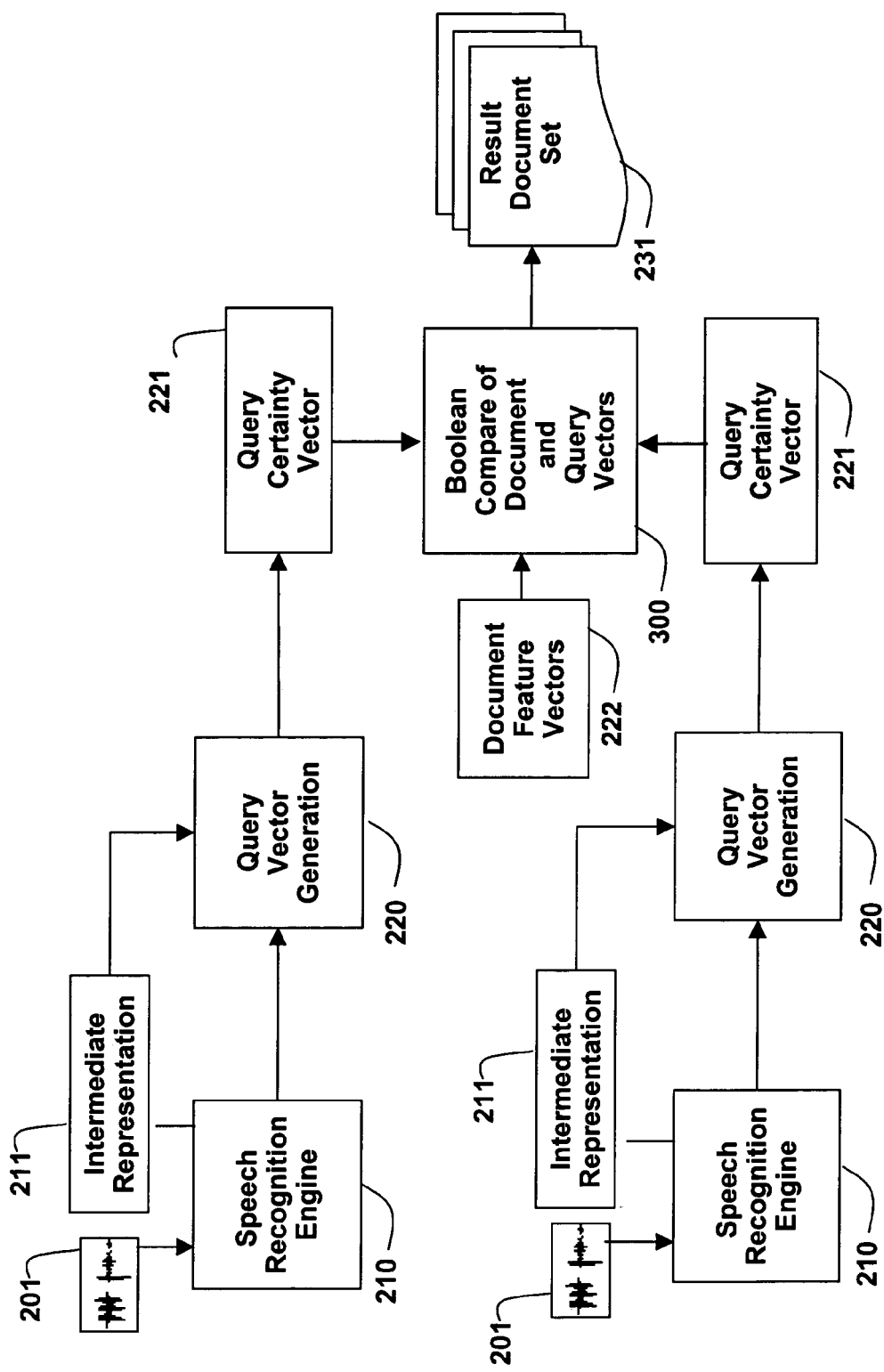
FIG. 3 is a block diagram of a retrieval system using multiple logical queries as other information to produce a set of result documents.

As shown in FIG. 3, multiple spoken queries 201 can be converted to multiple intermediate representations, and corresponding query certainty vectors. The multiple spoke queries are linked by terms indicating Boolean operators, such as, 'and', 'or', and 'not'. The multiple query vectors are than logically compared 300 with the document feature vectors according to the Boolean operators to produce the ranked set of result documents.

Combining Spoken Queries with Preferences

Figure 4:
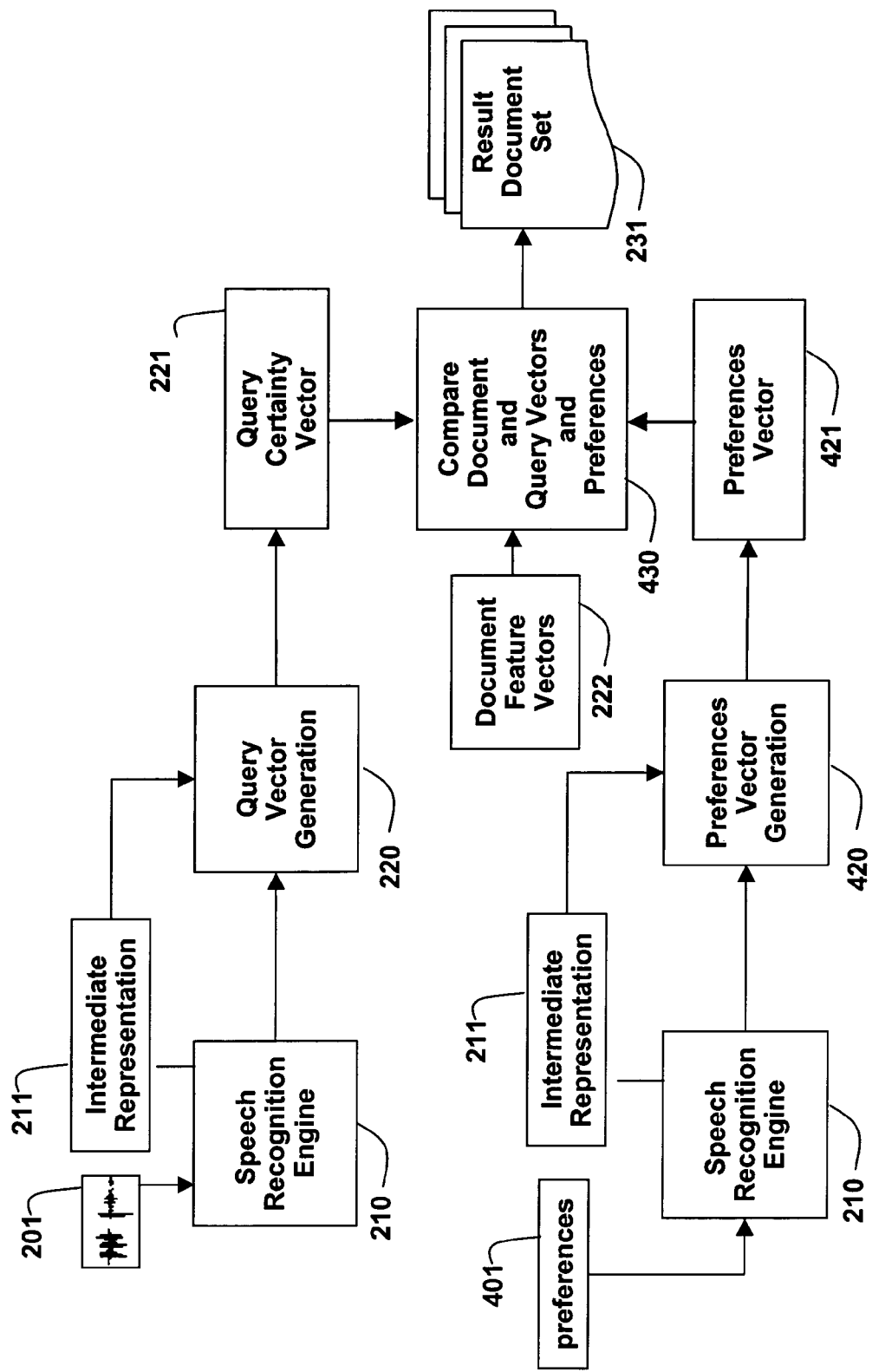
FIG. 4 is a block diagram of a retrieval system using preferences as other information to produce a set of result documents.

As shown in FIG. 4, the user can speak preference 401 that are converted to the intermediate representation. A preference vector 421 is generated 420 from the intermediate representation. Then, the document, query, and preference vector are compared 430 to produce the ranked set of result documents.

The preferences can be weighted. For example a very strong preference can receive a higher weight than moderate preferences. The preference can also be in the form of dislikes, which are given negative weights. In this case, the query certain vector is multiplied by the preference vector as part of the comparing 430. The multiplication can be element-wise.

It should be understood, that various forms of the other information can also be combined. For example, a final query into the database for a result set of documents can specify, location, Boolean operators, and preferences.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for indexing and retrieving documents stored in a database, comprising the steps of:

extracting a document feature vector from each of a plurality of documents;

indexing each of the plurality of documents according the associated document feature vector;

converting, using a processor, a spoken query to an intermediate representation representing possible sequential combinations of terms in the spoken query, the intermediate representation is selected from a group consisting of a lattice of terms, an n-best list, or combination thereof;

generating a query certainty vector from the intermediate representation; and comparing the query certainty vector to each of the document feature vectors to retrieve a ranked result set of documents.

2. The method of claim 1, further comprising:

projecting each document feature vector and the query certainty vector to a low dimension.

3. The method of claim 1, in which the intermediate representation is the lattice of terms.

4. The method of claim 1, in which the terms are words.

5. The method of claim 1, in which the terms are parts of words.

6. The method of claim 1, in which the intermediate representation is the n-best list.

7. The method of claim 1, in which the terms are phonemes.

8. The method of claim 1, in which the documents describe points of interest, each point of interest having a location, and further comprising:

determining a position of a user generating the spoken query;

determining a distance between the position of the user and each point of interest matching the spoken query to produce location information;

combining the location information with the query certainty vector; and ranking the set of result documents according to the location information and the query certainty vector.

9. The method of claim 1, further comprising:

converting a plurality of spoken queries to a plurality of intermediate representations, the plurality of spoken queries linked by logical operators;

generating a plurality of query certainty vectors from the plurality of intermediate representations; and comparing the plurality of query certainty vectors to each of the document feature vectors according to the logical operators to retrieve the ranked result set of documents.

10. The method of claim 1, further comprising:

converting a spoken preference to a corresponding intermediate representation;

generating a preference vector from the corresponding intermediate representation; and ranking the set of result documents according to the preference vector.

11. The method of claim 10, in which the preference vector is weighted by weights, and further comprising:

multiplying the query certainty vector by the preference vector.

12. The method of claim 11, in which the weights can be positive and negative, and further comprising:

comparing the query certainty vector and the preference vector to each of the document feature vectors to retrieve the ranked result set of documents.

13. A system for indexing and retrieving documents, comprising:

a plurality of documents, each document having an associated document feature vector;

a database indexing each of the plurality of documents according the associated document feature vector;

a speech recognition engine for converting a spoken query to an intermediate representation representing possible sequential combinations of terms in the spoken query;

a query module, comprising a processor, the query module configured for generating a query certainty vector from the intermediate representation; and a comparator configured to compare the query certainty vector to each of the document feature vectors to retrieve a ranked result set of documents.

\* \* \* \* \*